No. 608,863. Patented Aug. 9, 1898.
A. A. INNIS.
FEEDING TROUGH.
(Application filed Dec. 31, 1897.)
(No Model.)
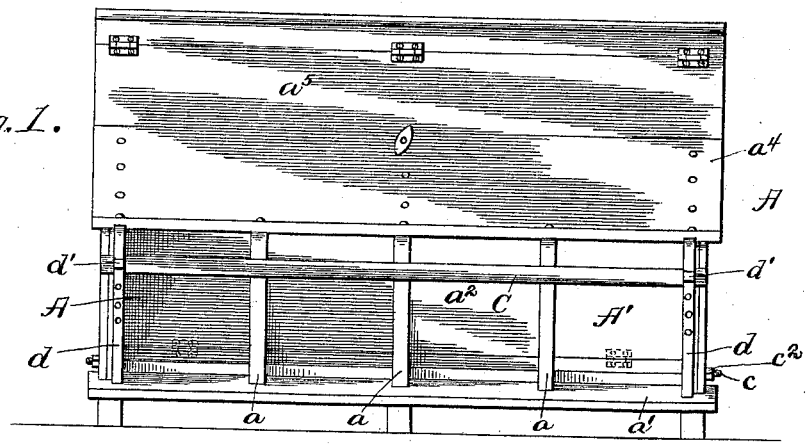
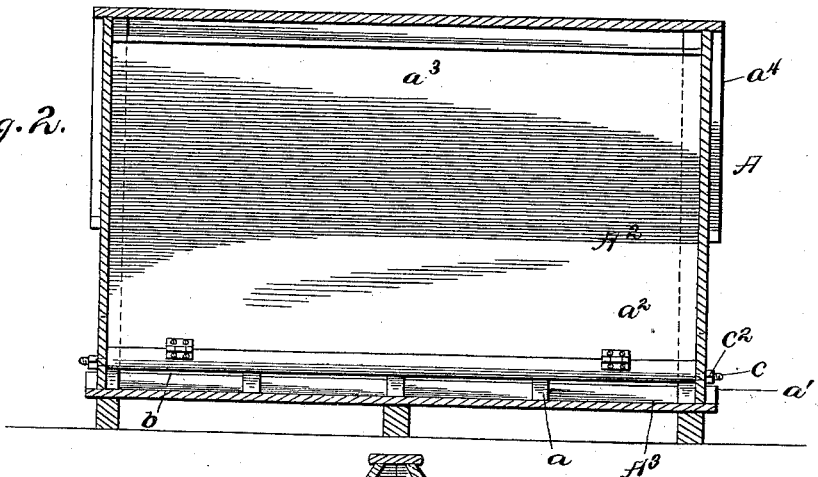
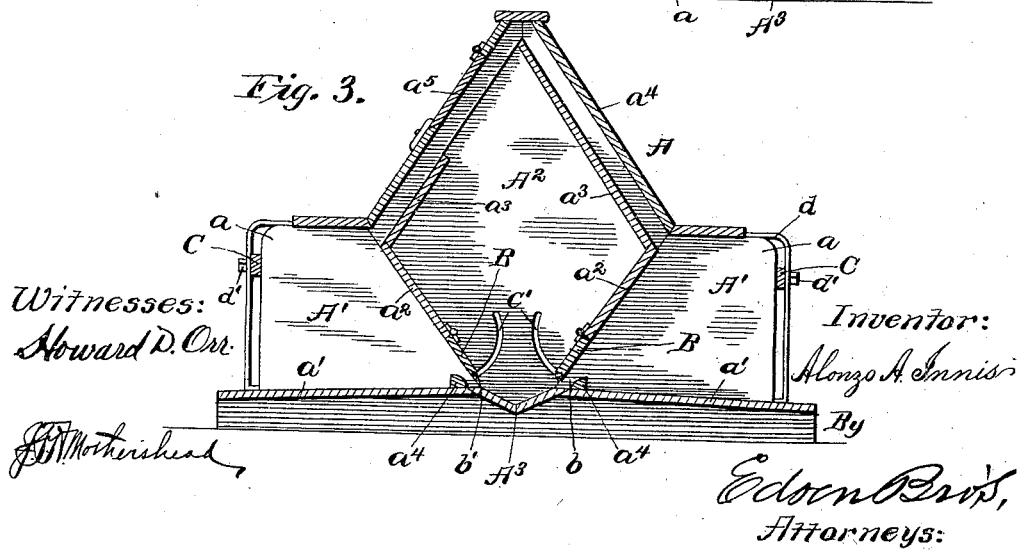

UNITED STATES PATENT OFFICE.

ALONZO A. INNIS, OF MILROY, INDIANA.

FEEDING-TROUGH.

SPECIFICATION forming part of Letters Patent No. 608,863, dated August 9, 1898.

Application filed December 31, 1897. Serial No. 664,955. (No model.)

*To all whom it may concern:*

Be it known that I, ALONZO A. INNIS, a citizen of the United States, residing at Milroy, in the county of Rush and State of Indiana, have invented certain new and useful Improvements in Feeding-Troughs; and I do hereby declare the following to be a full, clear, and exact description of the invention, such as will enable others skilled in the art to which it appertains to make and use the same.

My invention relates to improvements in feeding-troughs for animals, more especially hogs.

It has for its object to provide for the feeding of the hogs or animals singly, each by itself, thus avoiding crowding and agitation, as when the animals are all permitted to feed together, to regulate the feeding of the food to the trough in the required quantities, and to greatly simplify the construction of the parts and materially lessen the expense of their manufacture.

It consists of the peculiar construction, combination, and arrangement of the parts, all substantially as hereinafter more fully disclosed, and specifically pointed out in the claim.

In the accompanying drawings, illustrating the preferred form of carrying out my invention, Figure 1 is an elevation thereof. Fig. 2 is a longitudinal section, and Fig. 3 is a cross-section, of the same.

Latitude is allowed herein as to matters of detail, as these may be varied without departing from the spirit or principles of my invention, and the same yet remain intact.

A refers to a housing or casing constructed, preferably, with two opposed series of stalls A' A', adapted to accommodate, especially, hogs, and with a feeding-hopper receptacle $A^2$ arranged intermediately and transversely of the two series of stalls.

The stalls A' A' are constructed, preferably, of board partitions $a\ a$, with a suitable board floor $a'$ sloped rearward or outward to carry off drainage as a means of sanitation. The hopper or receptacle $A^2$ has two walls $a^2$ of its lower half inclined or sloped inward, with its extreme lower end arranged above and contiguously to a shallow trough $A^3$, having guards $a^\times$ to prevent scattering the feed, and it has two oppositely inclined or slanted boards $a^3$ in its upper half to admit ready access to said hopper or receptacle. The upper half of the hopper or receptacle is roofed in, as at $a^4$, with a hinged door $a^5$ in one side of the roof to provide for the placing of the food for the animals or hogs into said hopper or receptacle, as is apparent, said roof extending down and covering the stalls A' A' at both sides of the hopper, the whole thus being arranged under a common or single roof. The hopper or receptacle $A^2$ has hinged to its extreme lower portions opposite valves or boards B B, extending the entire length at each side of the longitudinal opening or slot $b$ of the hopper or receptacle. The valves or boards B are beveled or chamfered upon their outer sides, as at $b'$, so that when thrown up back against the inclined portions of the hopper the downward passage or movement of the feed or contents of the hopper will be unobstructed, as would otherwise be the case. Said valves also have projecting from their ends projections or rods $c$, carried through curved or arcuate slots $c'$ in the sides of the casing or housing A and fitted outside thereof with holding-nuts $c^2$ to secure said valves at their point of adjustment, according to the character of the food fed to the trough for the animals or hogs—as, for instance, when ground grain or corn is placed in the hopper or receptacle $A^2$ the valves are adjusted into their lowest or downward-inclined position, when small grain or shelled corn is fed thereinto the valves are set to extend slightly upward, and when corn on the ear is fed thereinto the valves are adjusted or turned upward back upon the sloping portions or walls of the hopper, as will be fully appreciated.

Across the outer ends of each series of the stalls A' is arranged a cross-bar C, passing or held under serially-perforated metal straps or keepers $d$, secured to the outer edges of the outer sides of, say, the two end stalls, and into the perforations of said straps or keepers and coincident apertures or perforations of said cross-bars are inserted adjusting-pins $d'$ to hold said cross-bars. By raising or lowering these bars it will be seen that animals or hogs, according to their height, small and large, can be admitted to the stalls, as may be required in feeding them to the best advantage, feeding small hogs at one time and large hogs at another time.

The structure thus produced is adapted to be mounted upon runners or shoes to permit ready transportation from place to place, as may be found convenient for feeding the animals or hogs. This invention therefore permits the regulating of the feeding of the hogs or animals, is highly useful for its purpose, is simple, readily constructed, and is cheaply manufactured. It also provides, as before stated, for the feeding of the hogs or animals singly, each by itself, thus avoiding crowding and agitation, as would occur when the animals or hogs are all permitted to be fed together.

Having thus fully described my invention, what I claim as new, and desire to secure by Letters Patent, is—

In an animal-feeding device, the housing or casing having stalls and a feed hopper or receptacle, having the hinged valves at its delivery end, provided with screw rods or projections extending through curved or arcuate slots in the sides of said housing or casing, and nuts applied to the outer screw-threaded ends of said rods or projections, substantially as set forth.

In testimony whereof I affix my signature in presence of two witnesses.

ALONZO A. INNIS.

Witnesses:
CURTIS McCOY,
MILLARD HUDSON.